(12) United States Patent
Kerr

(10) Patent No.: US 9,465,818 B2
(45) Date of Patent: Oct. 11, 2016

(54) FINGER BIOMETRIC SENSOR DATA SYNCHRONIZATION VIA A CLOUD COMPUTING DEVICE AND RELATED METHODS

(71) Applicant: APPLE INC., Cupertino, CA (US)

(72) Inventor: Gregory L. Kerr, Indialantic, FL (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/836,153

(22) Filed: Aug. 26, 2015

(65) Prior Publication Data

US 2015/0363398 A1   Dec. 17, 2015

Related U.S. Application Data

(63) Continuation-in-part of application No. 13/938,392, filed on Jul. 10, 2013, now abandoned.

(51) Int. Cl.
*G06F 17/30* (2006.01)
*G06K 9/00* (2006.01)

(52) U.S. Cl.
CPC .......... *G06F 17/3028* (2013.01); *G06K 9/001* (2013.01); *G06K 9/00087* (2013.01); *G06K 9/00093* (2013.01); *G06K 9/00926* (2013.01)

(58) Field of Classification Search
CPC ................ G06F 21/32; G06F 21/34; G06F 2221/2117; G06F 21/31; G06F 21/35; G06F 2221/2141; G06K 9/00087; G06K 9/00885; G06K 9/00006; G06K 2009/00932; G06K 9/00892; G06K 9/00577; G06K 9/00221; G06K 9/00604; G06K 9/00; G06K 9/00067; G06K 9/0061; G06K 9/00617; G06K 9/00926; G06K 2009/00583; G06K 2009/00953; G06K 9/001; G06K 9/00375; G06K 9/00899; G60K 9/00013; G07C 9/00087; G07C 2209/12; G07C 2009/00095; H04L 9/3231; H04L 63/0861; H04L 9/0866; H04L 9/32; A61B 5/117; A61B 5/1172; H04N 2201/3235

See application file for complete search history.

(56) References Cited

U.S. PATENT DOCUMENTS

| | | |
|---|---|---|
| 7,698,322 B1 | 4/2010 | Langley |
| 8,402,555 B2 | 3/2013 | Grecia |
| 8,533,860 B1 | 9/2013 | Grecia |

(Continued)

OTHER PUBLICATIONS

"*Unified Patents Inc. V. William Grecia*" Petition for Inter Partes Review of U.S. Pat. No. 8,402,555; Filed Mar. 22, 2016; pp. 65.

(Continued)

*Primary Examiner* — Edward Park
(74) *Attorney, Agent, or Firm* — Allen, Dyer, Doppelt, Milbrath & Gilchrist, P.A.

(57) ABSTRACT

An electronic system may include a first electronic device comprising a first finger biometric sensor and a first processor. The first processor may be capable of collecting enrollment finger biometric data from the first finger biometric sensor. The system may further include a cloud computing device capable of uploading and storing the enrollment finger biometric data, and a second electronic device. The second electronic device may include a second finger biometric sensor, and a second processor capable of collecting to-be matched finger biometric data from the second finger biometric sensor, and downloading the enrollment finger biometric data from the cloud computing device based upon matching between the enrollment and to-be matched finger biometric data.

25 Claims, 6 Drawing Sheets

(56) References Cited

U.S. PATENT DOCUMENTS

| | | |
|---|---|---|
| 8,887,308 B2 | 11/2014 | Grecia |
| 2002/0034319 A1 | 3/2002 | Tumey et al. |
| 2002/0138438 A1 | 9/2002 | Bardwell |
| 2005/0206501 A1 | 9/2005 | Farhat |
| 2011/0013813 A1 | 1/2011 | Yamamoto et al. |
| 2012/0278614 A1 | 11/2012 | Choi |
| 2013/0333015 A1 | 12/2013 | Reynolds |
| 2014/0195815 A1 † | 7/2014 | Taveau |
| 2015/0016694 A1 | 1/2015 | Kerr |

OTHER PUBLICATIONS

A New Fingerprint Authentication Scheme Based on Secret-Splitting for Enhanced Cloud Security, p. 183-196, Recent Application in Biometrics, ISBN 978-953-307-488-7, Published online Jul. 27, 2011.†

† cited by third party

FINGER BIOMETRIC SENSOR DATA SYNCHRONIZATION VIA A CLOUD COMPUTING DEVICE AND RELATED METHODS

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference or enrolled fingerprints already in a database to determine proper identification of a person, such as for verification purposes.

Traditional approaches for fingerprint matching sometimes rely on minutia, which are point features corresponding to ridge ends and bifurcations. Other approaches use fingerprint pattern features for matching. Examples of fingerprint pattern features include image pixel values, ridge flow, and ridge frequency.

Despite the existence of such fingerprint matching techniques, enrollment may become cumbersome for users in some instances, such as when multiple fingerprints, users, and/or devices are used.

SUMMARY

An electronic system may include a first electronic device comprising a first finger biometric sensor and a first processor. The first processor may be capable of collecting enrollment finger biometric data from the first finger biometric sensor. The system may further include a cloud computing device capable of uploading and storing the enrollment finger biometric data, and a second electronic device. The second electronic device may include a second finger biometric sensor, and a second processor capable of collecting to-be matched finger biometric data from the second finger biometric sensor, and downloading the enrollment finger biometric data from the cloud computing device based upon matching between the enrollment and to-be matched finger biometric data.

In one example embodiment, the first processor may be capable of performing the matching between the enrollment and to-be matched finger biometric data. In accordance with another example embodiment, the second processor may be capable of performing the matching between the enrollment and to-be matched finger biometric data. Furthermore, the first electronic device may also include a first account verification input device, and the first processor may be capable of collecting account enrollment verification data from the first account verification input device. Additionally, the second electronic device may further include a second account verification input device, and the second processor may be capable of collecting to-be matched account verification data from the second account verification input device. As such, the second processor may be capable of downloading the enrollment finger biometric data from the cloud computing device further based upon matching between the enrollment and to-be matched account verification data.

The second processor may also be capable of performing a new finger biometric match based upon the downloaded enrollment finger biometric data and new to-be matched finger biometric data from the second finger biometric sensor. Moreover, the second processor may also be capable of performing at least one device function based upon a successful new finger biometric match. In one example embodiment, the first processor may also be capable of encrypting the enrollment finger biometric data, and the second processor may also be capable of decrypting the enrollment finger biometric data.

In addition, the enrollment finger biometric data may comprise enrollment finger biometric data for a plurality of fingers, and the second processor may be capable of downloading the enrollment finger biometric data for the plurality of fingers based upon a match with at least one finger of the plurality thereof. The cloud computing device may also be capable of storing profile settings associated with account verification data, and the second processor may be capable of downloading the profile settings associated with account verification data from the cloud computing device along with the enrollment finger biometric data. Furthermore, the enrollment finger biometric data and the to-be matched finger biometric data each may comprise at least one of finger minutiae data and finger ridge flow data.

A related electronic device, such as the one described briefly above, and a method for using an electronic device are also provided.

DETAILED DESCRIPTION

Figure 1:
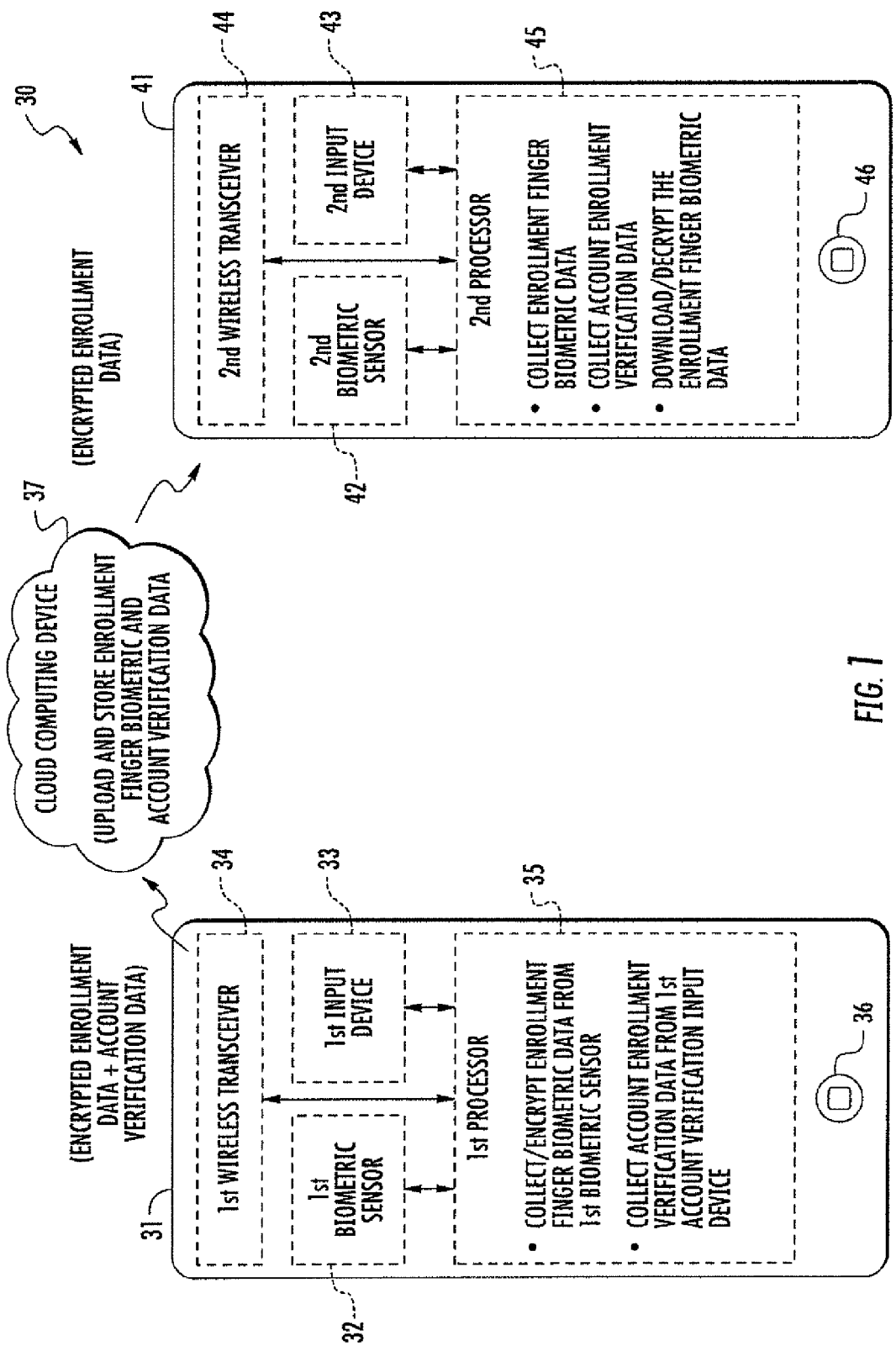
FIG. 1 is schematic block diagram of an electronic system providing cloud-based storage and exchange of enrollment finger biometric data in accordance with an example embodiment.

The present disclosure is provided with reference to the accompanying drawings, in which example embodiments are shown. However, other embodiments may be used in different applications, and this disclosure should accordingly not be construed as limited to the particular embodiments set forth herein. Rather, these embodiments are provided by way of example so that this disclosure will be thorough and complete. Like numbers refer to like elements throughout, and prime notation is used to indicate similar elements in different embodiments.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels.

Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data, and further contemplates user restrictions on storing data in cloud-based services and/or restricting access to the same. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Referring initially to FIG. 1, an electronic system 30 illustratively includes a first electronic device 31, which in turn includes a first biometric sensor 32, such as a finger biometric sensor, a first account verification input device 33, a first wireless transceiver 34, and a processor 35 cooperating with the first finger biometric sensor, the first account verification input device, and the first wireless transceiver. In the illustrated example, the electronic device 31 further illustratively includes a button 36 as an additional input device, which may be used as a "Home" or menu button in some implementations. However, it will be appreciated that different input device configurations than those shown in the example embodiments may be used. Moreover, while the embodiments described herein are provided with reference to finger biometric sensors for convenience of reference, it will be appreciated that other types of biometric sensors such as facial recognition sensors, blood vessel sensors, retinal sensors, pore sensors, voice recognition sensors, etc., may also be used in different embodiments.

By way of example, the first processor 35 may be implemented using a combination of hardware (e.g., microprocessor, etc.) and a non-transitory computer-readable medium having computer-executable instructions for performing the various operations described herein. The first finger biometric sensor 32 may be implemented as a stand-alone electronic device (e.g., a finger biometric chip or chipset), or some of the operations may be performed by shared resources of the electronic device 31 (e.g., a device microprocessor, etc.). By way of example, the first finger biometric sensor 32 is illustratively a static fingerprint sensor, but could be a swipe sensor in other embodiments. The finger sensing array may be located at different positions on the electronic device 31, such as on a housing of the electronic device, integrated with the button 36 as shown, or as part of a touch screen sensor array, for example.

The first account verification input device 33 may similarly be a touch screen (e.g., a digital or virtual keypad), although other input devices such as a physical keypad, holographic keypad, etc., may also be used. Also by way of example, the first wireless transceiver 34 may be a cellular transceiver, wireless local area network (WLAN) transceiver, etc. In the illustrated example, the electronic device 31 is a smartphone. Other example electronic devices may include telephones, laptop computers, tablet computers, personal digital assistants (PDAs), digital cameras, gaming devices, digital display devices, desktop computers, security terminals or stations, etc.

The system 30 further illustratively includes a cloud computing device 37, as well as a second electronic device 41. The second electronic device 41 illustratively includes a second finger biometric sensor 42, a second account verification input device 43, a second processor 45, and a button 46. The second electronic device 41 and the components thereof may be similar to the first electronic device 31 and its components discussed above. The cloud computing device 37 may be implemented as one or more servers which may be communicated with via the Internet, and which may be co-located or geographically distributed, for example, as will be appreciated by those skilled in the art. In one example embodiment, the cloud computing device 37 may be part of the iCloud® system from the present Assignee Apple Inc., although other cloud computing devices and systems may also be used.

Figure 2:
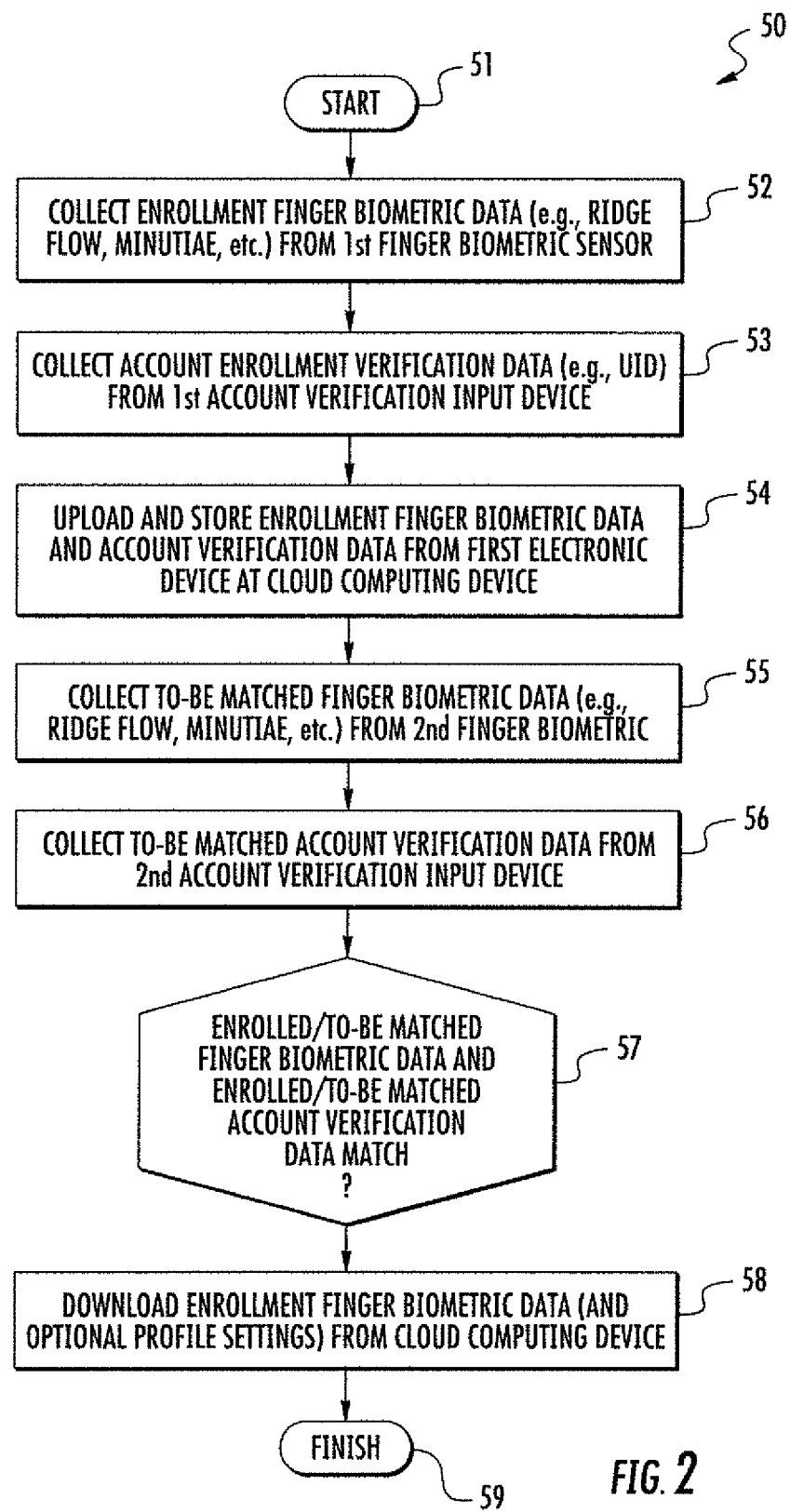
FIG. 2 is a flow diagram illustrating method aspects associated with the system of FIG. 1.

Referring additionally to the flowchart 50 of FIG. 2, beginning at Block 51, the first processor 35 may be capable of collecting enrollment finger biometric data or templates (e.g., minutiae, ridge flow, etc.) from the first finger biometric sensor 32, at Block 52. This may be done for one or more fingers, and for one or more users, as will be discussed further below. Furthermore, the processor 35 may further collect account enrollment verification data from the first account verification input device 33 with which the enrollment finger biometric data is to be associated. The account verification data may be a unique identifier (UID) which identifies a user's particular account. In accordance with one example embodiment, the account verification data may include a password, email address, user name, etc. In another example embodiment in which electronic devices from the present Assignee Apple Inc. are used, an Apple ID may be used as a user name for Apple® services (e.g., iTunes®, iCloud®, Apple® Online Store, etc.). Here again, other account verification data may be used for other types of accounts or services.

The cloud computing device 37 may be capable of uploading and storing the enrollment finger biometric data and account verification data from the first electronic device 31, at Block 54. As noted above, this information may be communicated to the cloud computing device 37 via the Internet, such as via a wireless link with the first wireless transceiver 34 (e.g., cellular, WLAN, etc.), or via a wired link. For the above-noted implementation using an Apple ID, the user may select a menu option to enroll a new fingerprint on the first mobile device, and the processor 35 may prompt the user to touch the finger sensor array and to provide the Apple ID, so that this information may then be communicated to the cloud computing device 37. It should be noted that the order in which the enrollment data and account enrollment verification data are provided may be reversed. Moreover, in some implementations, the first processor 35 may encrypt the enrollment data and/or account data using an encryption algorithm prior to uploading, if desired, as will be appreciated by those skilled in the art. Furthermore, the enrollment data may also be stored at the first electronic device 31 for comparison with latex-collected match finger enrollment data, such as when a user wishes subsequently use the first electronic device for accessing operations or services such as those described herein.

Once the enrollment finger biometric data is stored at the cloud computing device 37, this allows the user to conveniently download this data at the second electronic device 41 so that the enrollment process need not be repeated for the user to perform authentication operations on the second electronic device for the same account. In one example embodiment, the first electronic device 31 may be a smart phone belonging to a user, while the second electronic device 41 may be a tablet computer also belonging to the user. As such, since the user already has enrollment finger biometric data on the first electronic device 31 (i.e., smart phone), the user may relatively easily download that same enrollment data to the second electronic device 41 (i.e., tablet computer).

Collection of to-be matched finger biometric data from the second finger biometric sensor 42 is performed, at Block 55, and collection of to-be matched account verification data from the second account verification input device 43 is performed, at Block 56. Thus, downloading of the enrollment finger biometric data from the cloud computing device 37 may accordingly be performed based upon matching between the enrollment and to-be matched finger biometric data, and matching between the enrollment and to-be matched account verification data, at Blocks 57-58, which illustratively concludes the method of FIG. 2 (Block 59). This matching may be performed at the first electronic device 31, the second electronic device 41, or the cloud computing device 37, depending upon the given embodiment. In one example embodiment, the first electronic device 31 may send a key to the second electronic device 41, which is used to encrypt the to-be matched biometric data at the second electronic device so that it may be sent to the cloud computing device 37 or the first electronic device for matching with the enrollment biometric data. This may be advantageous for implementations where local laws or regulations may restrict the transfer of enrollment data from the cloud computer device 37 to other electronic devices, for example.

Accordingly, upon downloading of the enrollment finger biometric data from the cloud computing device 37, the second processor 45 may perform a new finger biometric match based upon the downloaded enrollment finger biometric data and new to-be matched finger biometric data from the second finger biometric sensor 42. That is, the user may use the same fingerprint that was enrolled at the first electronic device 31 to now perform one or more device functions at or with the second electronic device 41, yet without having to go through the enrollment process a second time with the second electronic device. Speeding up enrollment may be beneficial when a relatively small area biometric sensor is used that would otherwise use an enrollment procedure with approximately 10 to 20 finger placements, for example. As noted above, the enrollment finger biometric data may be encrypted by the first electronic device 31, and the second processor 45 may be capable of decrypting the enrollment finger biometric data upon downloading thereof, as will be appreciated by those skilled in the art.

Figure 3:
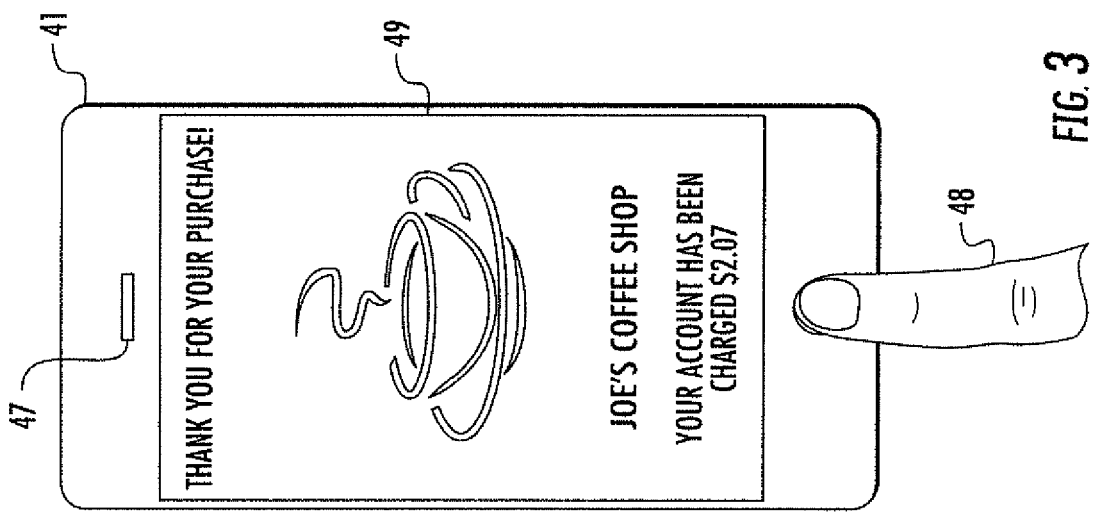

In one example embodiment, the device function may be a financial transaction, such as the electronic purchase illustrated in FIG. 3. Here, the second electronic device 41 illustratively includes a touch screen display 49 and a speaker port 47. When a finger 48 of the user which was previously enrolled on the first electronic device 31 is sensed and matched, the processor 45 may now determine that the given payment account is authorized to charge the particular transaction, which in this example is a mobile payment for a purchase from Joe's Coffee Shop in the amount of $2.07.

Figure 4:
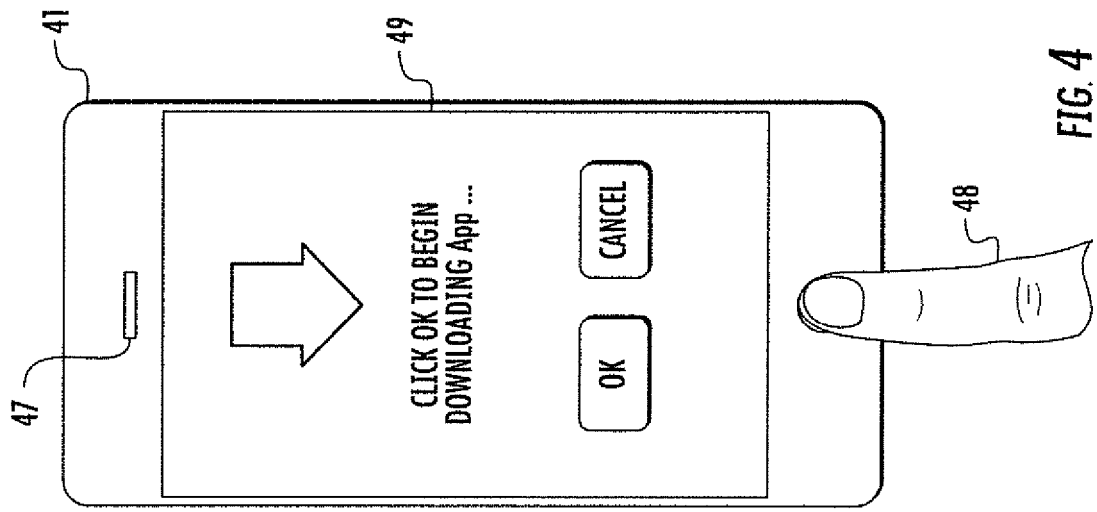
FIGS. 3 and 4 are front views of the second electronic device of the system of FIG. 1 performing different device functions based upon a successful match of new finger biometric data with downloaded enrollment finger biometric data.

In another example shown in FIG. 4, sensing and matching of the finger 48 is used to initiate a digital content download. Here, the user is attempting to download an app or application to the second electronic device 41, which upon successful matching with the previously-enrolled biometric data that has been downloaded from the cloud computing device 37, authenticates the app download operation. It should be noted that other digital content besides apps may also be authorized for download in this manner, such as music, videos, documents, etc.

Figure 5:
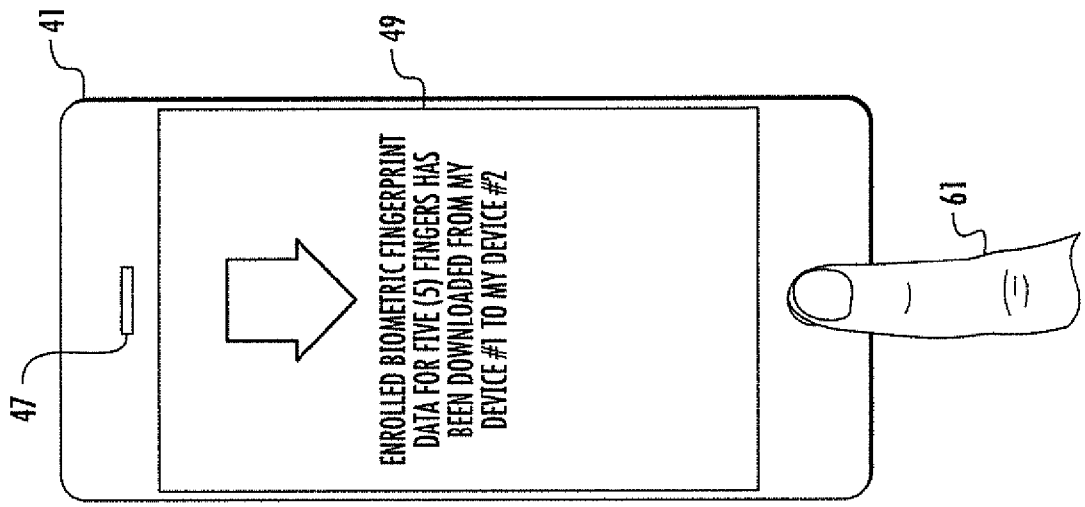
FIG. 5 is a schematic diagram illustrating enrollment and downloading of biometric finger data for a plurality of different fingers in accordance with an example embodiment.
Figure 5:
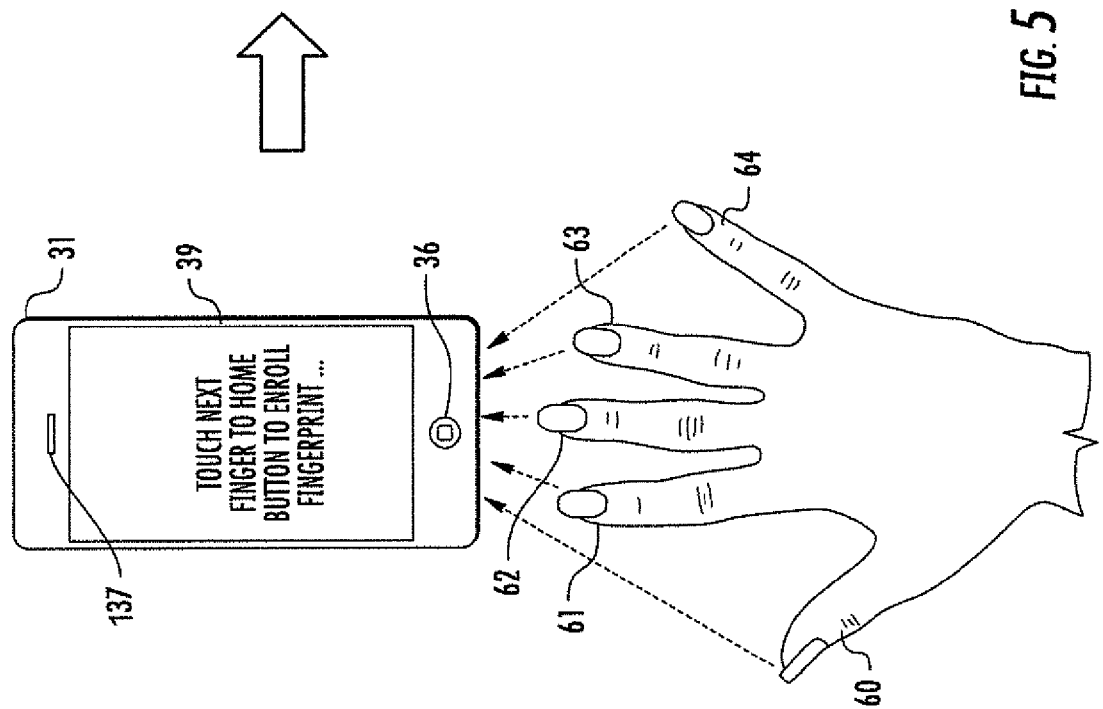

Referring now additionally to FIG. 5, as noted above, the enrollment finger biometric data may comprise enrollment finger biometric data for a plurality of fingers 60-64. In this example, the first electronic device 31 also includes a display 39 (e.g., a touch screen display) and a speaker port 137. The fingers 60-64 are enrolled at the first electronic device as shown on the left hand side of FIG. 5, following the instructions provided on the display 39 during the enrollment process. However, in some instances it may be desirable to sense one or more of the fingers 60-64 multiple times to obtain a suitable enrollment data set. Thus, if this is done for multiple fingers and for multiple users (e.g., multiple family members enroll multiple fingers on a common tablet computing device), then it would otherwise be cumbersome to enroll all of these fingers on the second device 41. The fingers 60-64 may all be used to authenticate the same operations, or different fingers may be assigned to authenticate different operations in some embodiments.

Yet, as noted above, the second processor 45 is capable of downloading the enrollment finger biometric data for the plurality of fingers 60-64 based upon a match with at least one finger of the plurality thereof, which in this example is the finger 61. Thus, in the right half of the figure, the display 49 provides an indication to the user that all of the enrollment finger biometric data for each of the fingers 60-64 has been successfully downloaded based upon the successful sensing and matching of the finger 61 alone.

In some embodiments, the cloud computing device 37 may also be capable of storing profile settings associated with the account verification data. For example, such profile settings may include alert and ringtone settings, application permission settings, calendar settings, contact settings, etc. As such, the second processor 45 may be capable of downloading the profile settings associated with account verification data from the cloud computing device 37, along with the enrollment finger biometric data, if desired.

Figure 6:
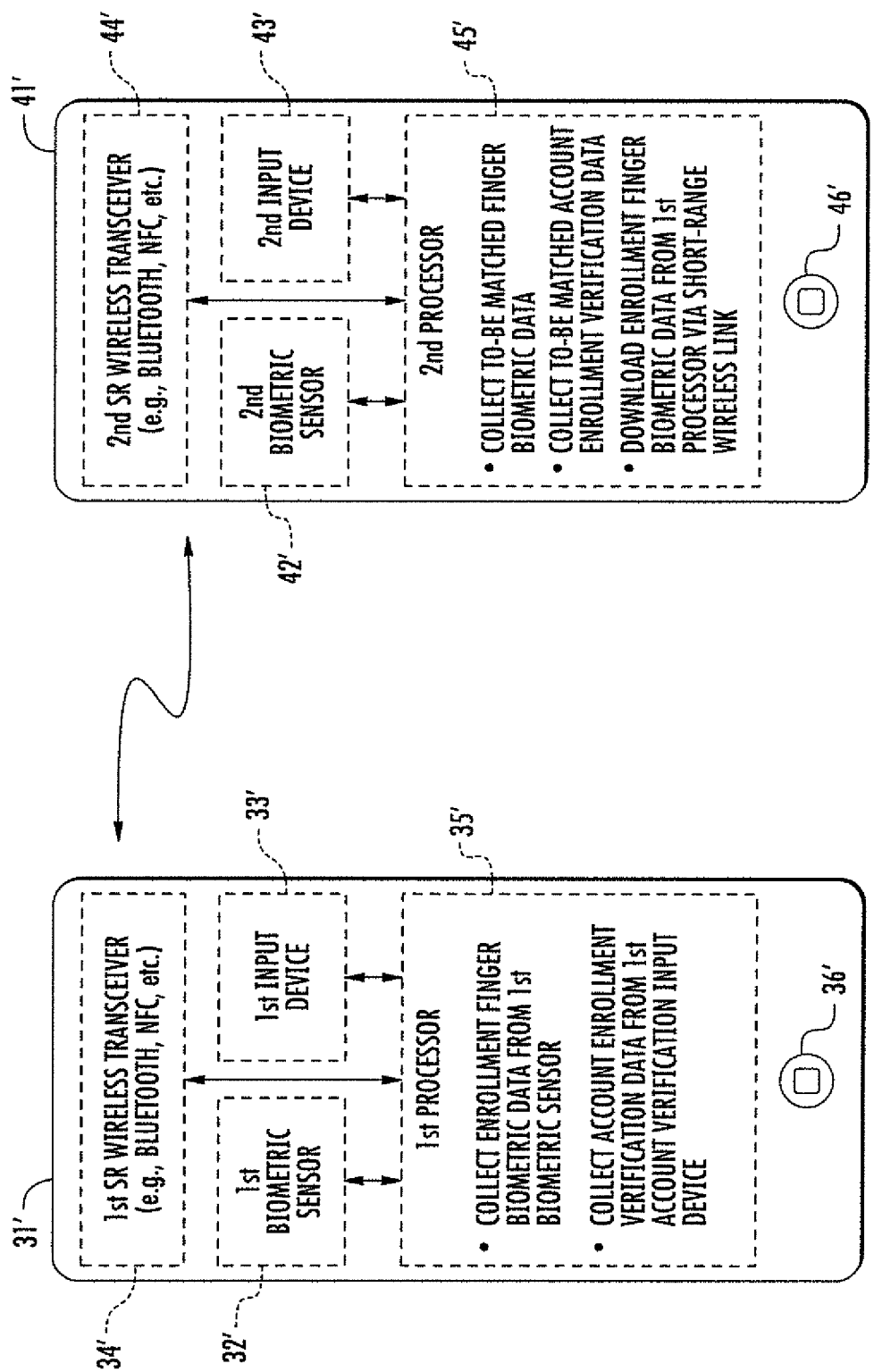
FIG. 6 is a schematic block diagram illustrating another example embodiment of an electronic system providing exchange of enrollment finger biometric data based upon short-range communication.
Figure 7:
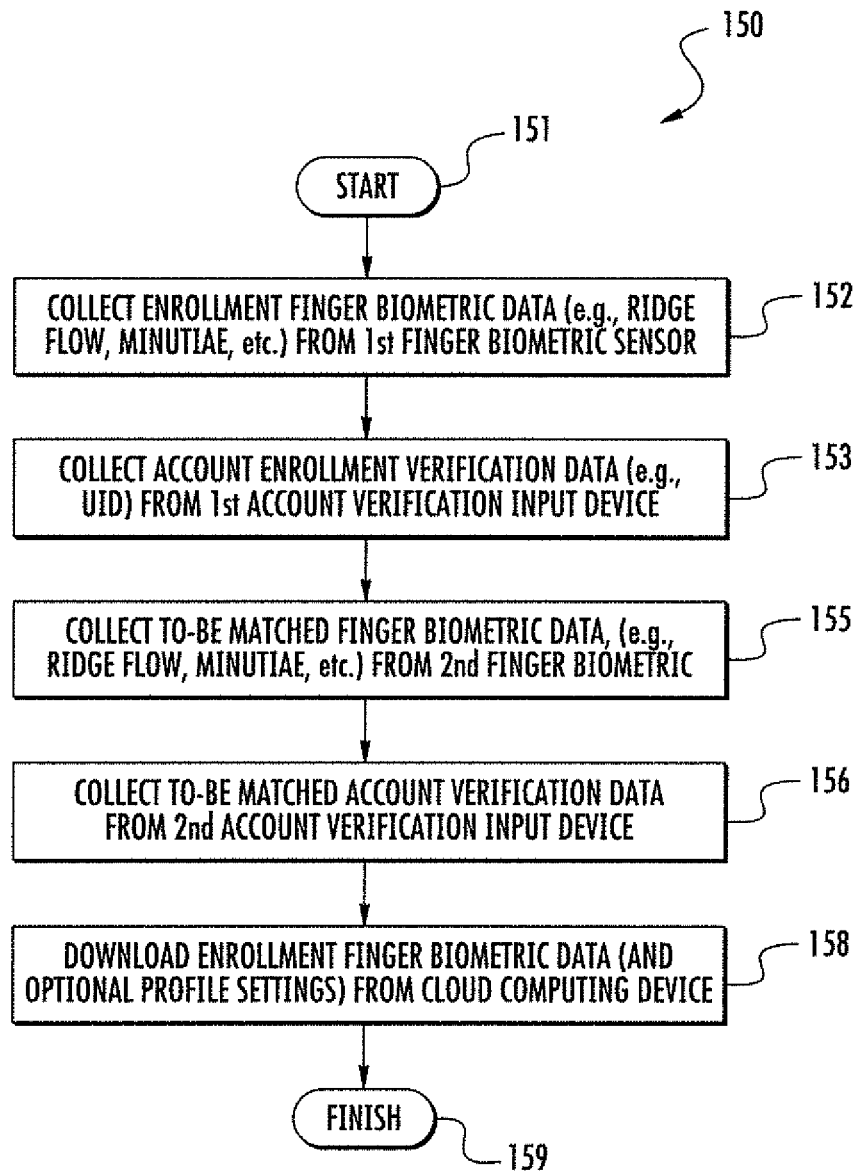
FIG. 7 is a flow diagram illustrating method aspects associated with the system of FIG. 6.

Referring now additionally to the system 30' of FIG. 6 and the flow diagram 150 of FIG. 7, in another example implementation the above enrollment data transfer and sharing operations may be provided directly between the first and second electronic devices 31', 41' via short-range communication without using a cloud. More particularly, beginning at Block 151, the first electronic device 31' illustratively includes a first finger biometric sensor 32', a first account verification input device 33', a first processor 35', and a button 36', similar to those discussed above. Moreover, the second electronic device 41' illustratively includes a second finger biometric sensor 42', a second account verification input device 43', a second processor 45', and a button 46', which again may be similar to those discussed above. In the present example, the first wireless transceiver 34' and the second wireless transceiver 44' may be short-range wireless communications receivers, such as near-field communication (NFC) or Bluetooth transceivers, for example, although other suitable short-range communications formats may also be used in different embodiments.

The first processor 35' may be capable of collecting enrollment finger biometric data from the first finger biometric sensor 32', at Block 152, and collecting account enrollment verification data from the first account verification input device 33', at Block 153, as similarly discussed above. Here again, the enrollment finger biometric data is associated with the account enrollment verification data.

The second processor 45' may further be capable of collecting to-be matched finger biometric data from the second finger biometric sensor 42', at Block 155, and collecting to-be matched account verification data from the second account verification input device 43', at Block 156, as similarly discussed above. Moreover, the second processor 45' may accordingly download the enrollment finger biometric data from the first processor 32' via a short-range wireless link between the first and second short-range wireless transceivers 34', 44', at Block 158, which illustratively concludes the method set forth in FIG. 7 (Block 159). The above-described device operations may then be authenticated and performed at the second electronic device 41', as described above with reference to FIGS. 1-5.

This approach may be helpful where a wired or high-speed wireless connection to the cloud computing device 37 is not immediately available. Another situation in which such an exchange of enrollment data between the first and second electronic devices 31', 41' may be helpful is when corporate or governmental restrictions may apply to the transfer of biometric data over a shared computing network, making such an exchange of biometric data impractical or impermissible, for example.

In some embodiments, the first electronic device 31 may be placed into a transfer mode to allow itself to be open for transferring of the enrollment biometric data, etc. For example, a menu-driven approach may be used to select the enrollment data transfer mode, such as by providing a sequence of menu options to allow a new device to be added to a user's account, and verify oneself before allowing the new device (e.g., the second electronic device 41) to "mate" with the current device (e.g., first electronic device 31), and thereby use the same biometric enrollment data, profile settings, etc.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:
1. An electronic system comprising:
a first electronic device comprising
a first finger biometric sensor, and
a first processor capable of collecting enrollment finger biometric data from the first finger biometric sensor, and encrypting the collected enrollment finger data;
a cloud computing server capable of uploading and storing the enrollment finger biometric data and account verification data from the first electronic device; and
a second electronic device comprising
a second finger biometric sensor, and
a second processor capable of receiving an encryption key from the first electronic device, collecting to-be matched finger biometric data from the second finger biometric sensor, encrypting the collected to-be matched finger biometric data using the encryption key, uploading the to-be matched finger biometric data to the cloud computing server for matching with the enrollment finger biometric data, and downloading and decrypting the enrollment finger biometric data from the cloud computing server based upon the matching between the enrollment and to-be matched finger biometric data.

2. The electronic system of claim 1 wherein the first processor is capable of performing the matching between the enrollment and to-be matched finger biometric data.

3. The electronic system of claim 1 wherein the second processor is capable of performing the matching between the enrollment and to-be matched finger biometric data.

4. The electronic system of claim 1 wherein the first electronic device further comprises a first account verification input device, and wherein the first processor is capable of collecting account enrollment verification data from the first account verification input device, the enrollment finger biometric data being associated with the account enrollment verification data; wherein the second electronic device further comprises a second account verification input device, and wherein the second processor is capable of collecting to-be matched account verification data from the second account verification input device; and wherein the second processor is capable of downloading the enrollment finger biometric data from the cloud computing server further based upon matching between the enrollment and to-be matched account verification data.

5. The electronic system of claim 1 wherein the second processor is also capable of performing a new finger biometric match based upon the downloaded enrollment finger biometric data and new to-be matched finger biometric data from the second finger biometric sensor.

6. The electronic system of claim 5 wherein the second processor is also capable of performing at least one device function based upon a successful new finger biometric match.

7. The electronic system of claim 1 wherein the enrollment finger biometric data comprises enrollment finger biometric data for a plurality of fingers; and wherein the second processor is capable of downloading the enrollment finger biometric data for the plurality of fingers based upon a match with at least one finger of the plurality thereof.

8. The electronic system of claim 1 wherein the cloud computing server is also capable of storing profile settings associated with account verification data; and wherein the second processor is capable of downloading the profile settings associated with account verification data from the cloud computing server along with the enrollment finger biometric data.

9. The electronic system of claim 1 wherein the enrollment finger biometric data and the to-be matched finger biometric data each comprises at least one of finger minutiae data and finger ridge flow data.

10. An electronic system comprising:
a first electronic device comprising
a first biometric sensor, and
a first processor capable of collecting enrollment biometric data from the first biometric sensor, and encrypting the collected enrollment finger data;
a cloud computing server capable of uploading and storing the enrollment biometric data and account verification data from the first electronic device; and
a second electronic device comprising
a second biometric sensor, and
a second processor capable of receiving an encryption key from the first electronic device, collecting to-be matched biometric data from the second biometric sensor, encrypting the collected to-be matched finger biometric data using the encryption key, uploading the to-be matched finger biometric data to the cloud computing server for matching with the enrollment finger biometric data, and downloading and decrypting the enrollment biometric data from the cloud computing server based upon the matching between the enrollment and to-be matched biometric data.

11. The electronic system of claim 10 wherein the first processor is capable of performing the matching between the enrollment and to-be matched biometric data.

12. The electronic system of claim 10 wherein the second processor is capable of performing the matching between the enrollment and to-be matched biometric data.

13. The electronic system of claim 10 wherein the first electronic device further comprises a first account verification input device, and wherein the first processor is capable of collecting account enrollment verification data from the first account verification input device, the enrollment finger biometric data being associated with the account enrollment verification data; wherein the second electronic device further comprises a second account verification input device, and wherein the second processor is capable of collecting to-be matched account verification data from the second account verification input device; and wherein the second processor is capable of downloading the enrollment biometric data from the cloud computing server further based upon matching between the enrollment and to-be matched account verification data.

14. The electronic system of claim 10 wherein the second processor is also capable of performing a new biometric match based upon the downloaded enrollment biometric data and new to-be matched biometric data from the second biometric sensor.

15. The electronic system of claim 10 wherein the first biometric sensor and the second biometric sensor each comprises at least one of a finger biometric sensor, a facial recognition sensor, a blood vessel sensor, a retinal sensor, a pore sensor, and a voice recognition sensor.

16. An electronic device comprising:
a finger biometric sensor; and
a processor capable of
receiving an encryption key from another electronic device,
collecting to-be matched finger biometric data from the finger biometric sensor,
encrypting the collected to-be matched biometric data from the finger biometric sensor finger data using the encryption key,
uploading the to-be matched finger biometric data to a cloud computing server for matching with enrollment finger biometric data collected by the other electronic device, and
downloading and decrypting the enrollment finger biometric data from the cloud computing server based upon the matching between the enrollment and to-be matched finger biometric data.

17. The electronic device of claim 16 wherein the processor is also capable of performing a new finger biometric match based upon the downloaded enrollment finger biometric data and new to-be matched finger biometric data from the finger biometric sensor.

18. The electronic device of claim 17 wherein the processor is also capable of performing at least one device function based upon a successful new finger biometric match.

19. The electronic device of claim 16 wherein the enrollment finger biometric data comprises enrollment finger biometric data for a plurality of fingers; and wherein the processor is capable of downloading the enrollment finger biometric data for the plurality of fingers based upon a match with at least one finger of the plurality thereof.

20. The electronic device of claim 16 wherein the cloud computing server is also capable of storing profile settings associated with account verification data; and wherein the processor is capable of downloading the profile settings associated with account verification data from the cloud computing server along with the enrollment finger biometric data.

21. A method for using an electronic device comprising a finger biometric sensor, the method comprising:
receiving an encryption key from another electronic device;
collecting to-be matched finger biometric data from the finger biometric sensor;
encrypting the collected to-be matched biometric data from the finger biometric sensor using the encryption key;
uploading the to-be matched finger biometric data to a cloud computing server for matching with enrollment finger biometric data collected by the other electronic device; and
downloading and decrypting the enrollment finger biometric data from the cloud computing server based upon the matching between the enrollment and to-be matched finger biometric data.

22. The method of claim 21 further comprising performing a new finger biometric match based upon the downloaded enrollment finger biometric data and new to-be matched finger biometric data from the finger biometric sensor.

23. The method of claim 22 further comprising performing at least one device function based upon a successful new finger biometric match.

24. The method of claim 21 wherein the enrollment finger biometric data comprises enrollment finger biometric data for a plurality of fingers; and wherein downloading comprises downloading the enrollment finger biometric data for the plurality of fingers based upon a match with at least one finger of the plurality thereof.

25. The method of claim 21 wherein the cloud computing server is also capable of storing profile settings associated with account verification data; and wherein downloading comprises the profile settings associated with account verification data from the cloud computing server along with the enrollment finger biometric data.

* * * * *